US012769273B2

(12) United States Patent
Stutz et al.

(10) Patent No.: US 12,769,273 B2
(45) Date of Patent: Oct. 20, 2026

(54) METHOD, DEVICES, COMPUTER PROGRAM AND COMPUTER-READABLE MEDIUM FOR USING CONFIGURABLE LOGIC FOR MODULAR SETUP OF A TECHNICAL INSTALLATION

(71) Applicant: Siemens Aktiengesellschaft, Munich (DE)

(72) Inventors: Andreas Stutz, Eggenstein-Leopoldshafen (DE); Mathias Maurmaier, Gerlingen (DE)

(73) Assignee: Siemens Aktiengesellschaft, Munich (DE)

( * ) Notice: Subject to any disclaimer, the term of this patent is extended or adjusted under 35 U.S.C. 154(b) by 346 days.

(21) Appl. No.: 18/569,693

(22) PCT Filed: Jun. 16, 2021

(86) PCT No.: PCT/EP2021/066303
§ 371 (c)(1),
(2) Date: Dec. 13, 2023

(87) PCT Pub. No.: WO2022/262973
PCT Pub. Date: Dec. 22, 2022

(65) Prior Publication Data
US 2024/0272600 A1 Aug. 15, 2024

(51) Int. Cl.
*G05B 19/042* (2006.01)
*H04L 67/12* (2022.01)
*H04L 67/55* (2022.01)

(52) U.S. Cl.
CPC ..... *G05B 19/0426* (2013.01); *G05B 19/0428* (2013.01); *G05B 2219/25065* (2013.01)

(58) Field of Classification Search
CPC ............ G05B 19/0426; G05B 19/0428; G05B 2219/25065; H04L 67/55; H04L 67/12
(Continued)

(56) References Cited

U.S. PATENT DOCUMENTS

2011/0296430 A1* 12/2011 Jandhyala ........... G06F 21/6218 709/219
2014/0100668 A1 4/2014 Jundt et al.
(Continued)

FOREIGN PATENT DOCUMENTS

CN 108052073 5/2018
CN 108475045 8/2018
(Continued)

OTHER PUBLICATIONS

VDI/DE/NAMUR 2658 Blatt 1 Entwurf "Automatisierungstechnisches Engineering modularer Anlagen in der Prozessindustrie", Jun. 2017 (origin: vom Verein Deutscher Ingenieure (VDI) veröffentlichter Entwurf der Norm "VDI/DE/NAMUR 2658" dated Jan. 4, 2018—MIF).
(Continued)

*Primary Examiner* — Michael J Brown
(74) *Attorney, Agent, or Firm* — Cozen O'Connor

(57) ABSTRACT

A functional module includes at least one technical object for performing a technical process, a control unit which control the technical object based on previously determined rules and interconnections that are being permanently stored in the control unit, a communication unit which interchanges data with external communication partners, wherein the functional module has a configurable logic unit which uses the communication unit to receive additional, variably predefinable rules and interconnections from an external communication partner and to take the additional, variably predefinable rules and interconnections as a basis for supplementing the rules and interconnections previously determined in the control unit with respect to an interaction of the functional module with at least one further functional module.

21 Claims, 3 Drawing Sheets

(58) Field of Classification Search
USPC .............................................................. 700/86
See application file for complete search history.

(56) References Cited

U.S. PATENT DOCUMENTS

| | | | | |
|---|---|---|---|---|
| 2015/0301547 | A1* | 10/2015 | Johansson ................ | G05F 1/66 700/295 |
| 2017/0308067 | A1 | 10/2017 | Lamparter et al. | |
| 2017/0336782 | A1 | 11/2017 | Maurmaier et al. | |
| 2019/0025785 | A1 | 1/2019 | Albers et al. | |
| 2020/0333770 | A1 | 10/2020 | Schulz et al. | |

FOREIGN PATENT DOCUMENTS

| | | |
|---|---|---|
| CN | 111756809 | 10/2020 |
| CN | 111831700 | 10/2020 |
| EP | 3246773 | 11/2017 |
| WO | 2016074730 | 5/2016 |
| WO | 2017064560 | 4/2017 |

OTHER PUBLICATIONS

Burger, Andreas et al. "Automatisierte Inbetriebnahme von Industriellen IoT-Systemen in der Prozessautomatisierung: Eine Referenzarchitektur"; AUTOMATISIERUNGSTECHNIK—AT.; Bd. 67, Nr. 3; pp. 172-182; Mar. 26, 2019.
Koziolek Heiko et al. "Self-Commissioning Industrial IoTSystems in Process Automation: A Reference Architecture"; 2018 IEEE International Conference on Software Architecture (ICSA); pp. 196-205; 2018.
PCT International Preliminary Examination Report and Written Opinion of International Examination Authority mailed Sep. 20, 2023 corresponding to PCT International Application No. PCT/EP2021/066303 filed Jun. 16, 2021.

* cited by examiner

METHOD, DEVICES, COMPUTER PROGRAM AND COMPUTER-READABLE MEDIUM FOR USING CONFIGURABLE LOGIC FOR MODULAR SETUP OF A TECHNICAL INSTALLATION

CROSS-REFERENCE TO RELATED APPLICATIONS

This is a U.S. national stage of application No. PCT/EP2021/066303 filed 16 Jun. 2021.

BACKGROUND OF THE INVENTION

1. Field of the Invention

The invention relates to a functional module, comprising at least one technical object that implements a technical process, a control unit which controls the technical object based on predetermined rules and interconnections that are permanently stored in the control unit, a communication unit which exchanges data with external communication partners.

The invention additionally relates to a technical installation comprising a plurality of functional modules, and also relates to a method for operating a functional module in a technical installation, and to a computer program with program code instructions which are executable by a computer and a computer-readable medium.

2. Description of the Related Art

Primarily in the pharmaceutical and specialty chemicals industries, heavy demands are placed on the operators of technical installations to be able to react rapidly to changing market requirements. Modular installations enable the installation operators to shorten the time-to-market significantly and to be able to react rapidly to altered market conditions via a re-structuring of the installation with relatively little effort. For this purpose, the installation operators can build up a pool of modular units (e.g., process units) with the aid of which they can assemble a specific installation via orchestration. If the installation is to be restructured, then individual modules are removed and are replaced with other, for example, more efficient, modules.

In conventional automation systems, such as "PCS 7" or "TIA portal" from the Siemens company, the orchestration of modules is based upon classic concepts of automation technology. Therein, communication connections are project planned, operator displays are developed and higher-level process sequences are created with languages such as "S7-graph" or "SFC (sequential flow chart)". This is complex and, due to the lack of relevant experience on the part of process technicians, practicable only with difficulty.

WO 2016/074730 A1 describes a method for creating a modular technical installation via self-description information regarding the modules. This method is based upon self-description information regarding the individual modules that is available online. In an orchestration process of a modular installation, however, this information is typically not available (online), because planning occurs offline based on statistical type description information, such as the module type package (MTP) (see the proposal for the standard "VDI/VDE/NAMUR 2658" published on Jan. 4, 2018 by the Verein Deutscher Ingenieure (VDI) (Association of German Engineers)).

Modern modularizing approaches, such as in the processing industry, do not consider any locking across modules. However, in order to realize locking across modules, in many cases both a direct M2M (machine-to-machine) communication and also a configurable Boolean logic for flexible logical linkage of different sources and sinks are necessary.

EP 3 246 773 A1 discloses a functional module for use during the operation of a technical installation, which can capture parameters relating to the running of a technical process in the functional module from an engineering tool of the technical installation. However, during the operation of a technical installation, typically a plurality of functional modules must interact with one another in order to process a higher-order production task. EP 3 246 773 A1 provides no solutions or suggestions of solutions to the problem of the interaction of the functional modules with one another.

It is known, for technical installations for production processes intended therefor, to undertake targeted development and static project planning. It is also known to design technical installations in a modular manner with individual functional modules and to orchestrate an interplay of the individual functional modules via a higher-order control level. However, this involves an enormous communication effort between the individual functional modules and the higher-order control level. Particularly with the provision of a large number of functional modules, the control level can reach its load limits.

SUMMARY OF THE INVENTION

It is an object of the invention to provide a cooperation of a large number of functional modules of a technical installation to be simpler and more efficient.

This and other objects and advantages are achieved in accordance with the invention by a functional module comprising at least one technical object that implements a technical process, a control unit that controls the technical object based on predetermined rules and interconnections that are permanently stored in the control unit, a communication unit which exchanges data with external communication partners. The functional module has a configurable logic unit that is configured to receive, via the communication unit, additional, variably specifiable rules and interconnections from an external communication partner and, based on the additional, variably specifiable rules and interconnections, to supplement the rules and interconnections predetermined in the control unit with regard to an interaction of the functional module with at least one further functional module.

A "functional module" is understood to be a discrete technical unit that can be integrated into a higher-order control level of the technical installation. Such a functional module can be, for example, a combination of a plurality of measuring sites or a relatively large portion of the technical installation. A functional module can comprise any combination of individual control elements, sensors or automation components. In addition, software representations of, for example, individual control elements can be part of a functional module.

The functional module comprises at least one technical object, preferably a plurality of technical objects with the aid of which a technical process can be performed. For example, a technical object can be a heating boiler with which a liquid can be heated. The functional module comprises, in addition to the technical objects that are provided and configured for process implementation, (at least) one control unit. This controls (and possibly regulates) the technical object or the technical objects based on rules and interconnections permanently stored in the functional module. These can be specified by a manufacturer of the functional module and stored in the functional module.

The functional module can be configured to perform a complex function in the technical installation, for instance, the controlled pumping of liquid, the heating of water and the maintenance of a particular temperature in a tank, the execution of a filter functionality and suchlike. For this purpose, the functional module can have, for example, valves, tanks, sensors and suchlike as technical objects.

The rules and interconnections therein support the running or the execution of one or more processes within the functional module with the aid of the technical objects contained within the functional module. For example, rules can have been specified as to how the control unit (or control units) of the functional module is to control the technical objects, for example, dependent upon a selected operating mode.

The (automation-related) interconnections permanently stored in the functional module therein serve to link the individual technical objects to one another. Part of the interconnections can be, for example, identifications and specifications of the individual technical objects that must be known to the individual technical objects in order to be able to interact with one another.

A part of such an interconnection can, however, also be, for example, the information that a tank is connected to a pump which can pump a fluid into the tank.

The functional module also has a communication unit that serves to exchange data with external communication partners. This communication unit can comprise a server and a client, in particular an Open Platform Communications Unified Architecture (OPC UA) server and an OPC UA client. Alternatively or additionally, the communication unit can also comprise a publisher and a subscriber or subscribers, in particular an OPC UA publisher and an OPC UA subscriber/subscribers. Publish/subscribe is a widely used and known mechanism for obtaining information in the form of messages regarding the subscribers of publishers.

A substantial innovation relative to known functional modules is the configurable logic unit. The logic unit can receive additional, variably specifiable rules and interconnections (i.e., dynamic rules and interconnections) from an external communication partner, for example, a higher-level orchestration tool of the technical installation.

The variably specifiable rules and interconnections are not a parameterization of the functional module that is specified by a project planning tool or an application.

The (static) rules and interconnections relate not only to the interoperability of the individual technical objects of the functional module itself, but also to at least one interface that has the functional module to enable an interaction of the functional module with one or more further functional modules. In a manner that is per se known, the control unit can have computer-implemented functional blocks that the control unit can use to control the technical objects based on the rules and interconnections permanently stored in the control unit. These functional blocks have fixedly specified functionalities that cannot be changed. The rules and interconnections permanently stored in the control unit define an interaction of the individual functional blocks with one another and the interaction of the functional blocks with the interface or interfaces to other external functional modules. For the specification of the rules and interconnections, for example, the integrated development environment for programmable control systems from the Siemens company named “Totally Integrated Automation Portal” can have been used.

The configurable logic unit can have computer-implemented functional blocks and can be configured to undertake, based on the received additional, variably specifiable rules and interconnections, a supplementation of the rules and interconnections predetermined in the control unit with regard to an interaction of the functional module with at least one further functional module based on the computer-implemented functional blocks of the configurable logic unit. It is therein essential that the additional, variably specifiable rules and interconnections cannot alter the structure of the configurable logic unit of the functional module. The additional, variably specifiable rules and interconnections relate exclusively to the cooperation of the individual functional blocks of the configurable logic unit with regard to an interaction of the functional module with at least one further (external) functional module.

By way of the communication of the additional, variably specifiable rules and interconnections to the logic unit, the functional module can be adapted in a targeted and dynamic manner to the actual use in the context of the technical installation, specifically to the interaction with at least one further functional module.

The configurable logic unit is thus to be regarded as a constituent of the functional module that can be dynamically adapted to different utilization scenarios of the functional module within the technical installation. It is to be regarded as a supplement to the static rules and interconnections permanently stored in the functional module. The rules and interconnections permanently stored in the functional module (or the control unit) are not capable of being amended, which is significant specifically with regard to a certification of the functional module (e.g., in the pharmaceutical field).

The configurable logic unit further comprises a memory store in which the dynamic (variable) rules and interconnections can be stored. Therein, a separate memory store or a memory store of the control unit can used as a common memory store. The dynamic rules and interconnections can include states of external, i.e., further functional modules apart from the functional module and, dependent upon these states, can modify the interaction of the functional modules with further functional modules (for example, close a valve or throttle the pumping output of a pump). The dynamic rules and interconnections can thus be relations between states of external functional modules (for example, states of particular signals that originate from external functional modules) and the technical objects (or the interface or interfaces of the functional module). The states can be implemented, for example, via pointer constructions using information technology in the configurable logic units.

By way of the configurable logic unit, the functional module is configured adaptively and can effectively adapt to changing usage conditions within a technical installation (or on a change into another technical installation).

The communication unit can advantageously be configured and provided to receive information relating to a communication unit of the at least one further functional module, in particular relating to a network address of the communication units of the at least one further functional module and to store it in the functional module. This information can be provided to the communication unit of the functional module by a higher-order orchestration system, for example, by the tool “SIMATIC PCS neo” from the Siemens company. It is also possible that the manufacturer of the functional module already stores the information permanently in the functional module. For this purpose, however, the manufacturer must know the information relating to the communication unit of another functional module. This can be the case if the further functional module originates from the same manufacturer. Alternatively, the information can originate from a standardization process or can be described to be manufacturer-independent and thus be freely accessible to all manufacturers.

The objects and advantages in accordance with the invention are also achieved by a technical installation that comprises a plurality of functional modules as described above, where the functional modules are connected for an interaction with one another. The technical installation can be an installation of the process industry, such as a chemical, pharmaceutical, petrochemical installation or an installation of the food and luxury produce industry. Included thereby are also any technical installations of the production industry, factories in which, for example, automobiles or goods of all kinds are produced. Wind turbines, solar installations or power stations for energy generation are also included by the expression technical installation.

Preferably, the technical installation comprises a configuration system that is configured to communicate the additional, variably specifiable rules and interconnections to the communication unit of one of the functional modules or to a plurality of communication units of a plurality of functional modules. Another expression for the configuration system is an "orchestration system". An example of such a configuration system is the tool "SIMATIC PCS neo" from the Siemens company.

Particularly preferably, the technical installation comprises a visualization system that is configured to visualize the rules and interconnections used to control the technical object or technical objects of the functional module. With the aid of such a graphical representation, the functional module can be integrated or orchestrated simply and efficiently into the technical installation for performing a technical process. It is possible, by way of the visualization system, to obtain an overview of the rules and interconnections that are currently applicable or active in the functional module and possibly to supplement them.

The objects and advantages in accordance with the invention are additionally achieved by a method for operating a functional module in a technical installation, where the functional module comprises at least one technical object that implements a technical process, a control unit that controls the technical objects based on predetermined rules and interconnections, a communication unit that is configured to exchange data with external communication partners, and a logic unit.

The method is comprises a) permanently storing the predetermined rules and interconnections in the control unit; b) transferring additional, variably specifiable rules and interconnections to the logic unit of the functional module via an external communication partner of the functional module; c) supplementing the predetermined rules and interconnections stored in the control unit based on the previously received additional, variably specifiable rules and interconnections with regard to an interaction of the functional module with at least one further functional module via the logic unit; and d) operating the functional module based on the adapted rules and interconnections in the technical installation.

Preferably, method step b) therein occurs based on a server-client architecture, in particular an OPC UA server-client architecture. Particularly preferably, method step b) occurs based on a publisher-subscriber architecture, in particular an OPC UA publisher-subscriber architecture.

In an embodiment of the method, the communication unit receives information relating to communication units of the at least one further functional module, in particular relating to a network address of a communication unit of the at least one further functional module and stores it in the functional module.

The communication partner from which the communication unit of the functional module receives the additional, variably specifiable rules and interconnections can be a configuration system which is configured to communicate to the communication unit of the functional module and a communication unit of at least one further functional module additional, variably specifiable rules and interconnections at a runtime of the technical installation, where based on the previously permanently stored rules and interconnections and based on the additional, variably specifiable rules and interconnections, the functional module and the at least one further functional module interact with one another and possibly with further functional modules at a runtime of the technical installation.

The rules and interconnections used for controlling the technical object or technical objects of the functional module can be visualized via a visualization system.

The objects and advantages in accordance with the invention are additionally achieved by a computer program with program code instructions which can be executed by a computer to implement the above-described method in accordance with the disclosed embodiments and by a computer-readable medium, comprising commands that on execution by a computer cause it to implement the disclosed embodiments of the method in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now be described more clearly and intelligibly in relation to exemplary embodiments, illustrated in detail by reference to the drawings, in which.

DETAILED DESCRIPTION OF THE EXEMPLARY EMBODIMENTS

Figure 1:
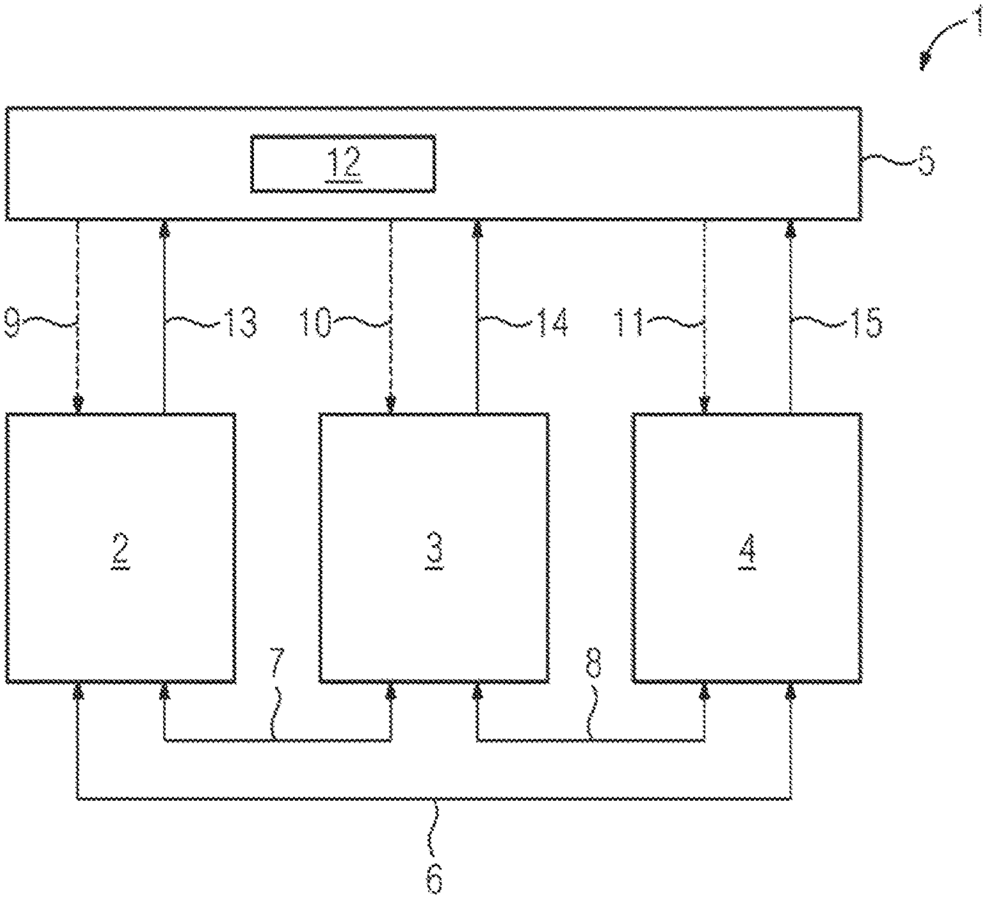
FIG. 1 shows a schematic representation of technical installation in accordance with the invention.

FIG. 1 shows a modular structured technical installation 1. The technical installation 1 comprises a first functional module 1, a second functional module 3 and a third functional module 4. In addition, the technical installation comprises a configuration system 5.

Each functional module 2, 3, 4 comprises technical objects (not shown in FIG. 1), one or more control units and one or more communication units. Permanently stored in the control unit by the respective manufacturers of the functional modules 2, 3, 4 are rules and interconnections which the respective control units use for controlling (and possibly regulating) the technical objects in order to implement or perform a technical process (for example, a recipe for creating a particular substance combination).

The individual functional modules 2, 3, 4 are interconnected via connecting lines 6, 7, 8 to enable an interaction. Via these connecting lines 6, 7, 8, information can be exchanged between the individual functional modules 2, 3, 4. For this purpose, for example, an Open Platform Communications Unified Architecture (OPC UA) server client or a publisher-subscriber architecture can be used. It should be noted that further connections between the functional modules 2, 3, 4 that relate to a transport of substances or goods between the individual functional modules 2, 3, 4 can be present. However, these are not shown in the drawings for reasons of clarity.

The communication units of the functional modules 2, 3, 4 are each configured to receive information items 9, 10, 11 relating to the communication units of the other functional modules 2, 3, 4 from the configuration system 5 and to store them in the respective functional modules 2, 3, 4. The information items 9, 10, 11 can be, for example, end point/node IDs in the case of a server-client architecture or a topic ID in the case of a publisher-subscriber architecture. The information items 9, 10, 11 can have been communicated previously to the configuration system 5 by the respective functional modules 2, 3, 4. It is also possible that the configuration system 5 has requested the information items 9, 10, 11 in advance based on an unambiguous identification of the respective functional module 2, 3, 4 from a respective manufacturer of the functional module 2, 3, 4. Particularly, but not exclusively, in the case of relatively simply structured functional modules 2, 3, 4 (which have, for example, only one operating mode), it is also possible that the individual functional modules 2, 3, 4 transfer the information items 9, 10, 11 also in the direct exchange with one another (without the assistance of the configuration system 5).

The configuration system 5 additionally transfers variably specifiable rules and interconnections to the respective functional modules 2, 3, 4, which regulate an interaction of the functional modules 2, 3, 4 with one another. For details of such rules and interconnections, reference should be made to the description relating to FIGS. 2 and 3.

A visualization system 12 is implemented in the configuration system 5. This establishes current states 13, 14, 15 of the respective functional modules 2, 3, 4 and represents them visually to an operator or an administrator of the technical installation 1. The expression "state" herein means that the currently applicable rules and interconnections applicable in the functional module 2, 3, 4 are established. The visualization of these states provides to the operator/administrator a quickly comprehensible and targeted overview in relation to all the internal and external interconnections/rules/locking within the technical installation.

Figure 2:
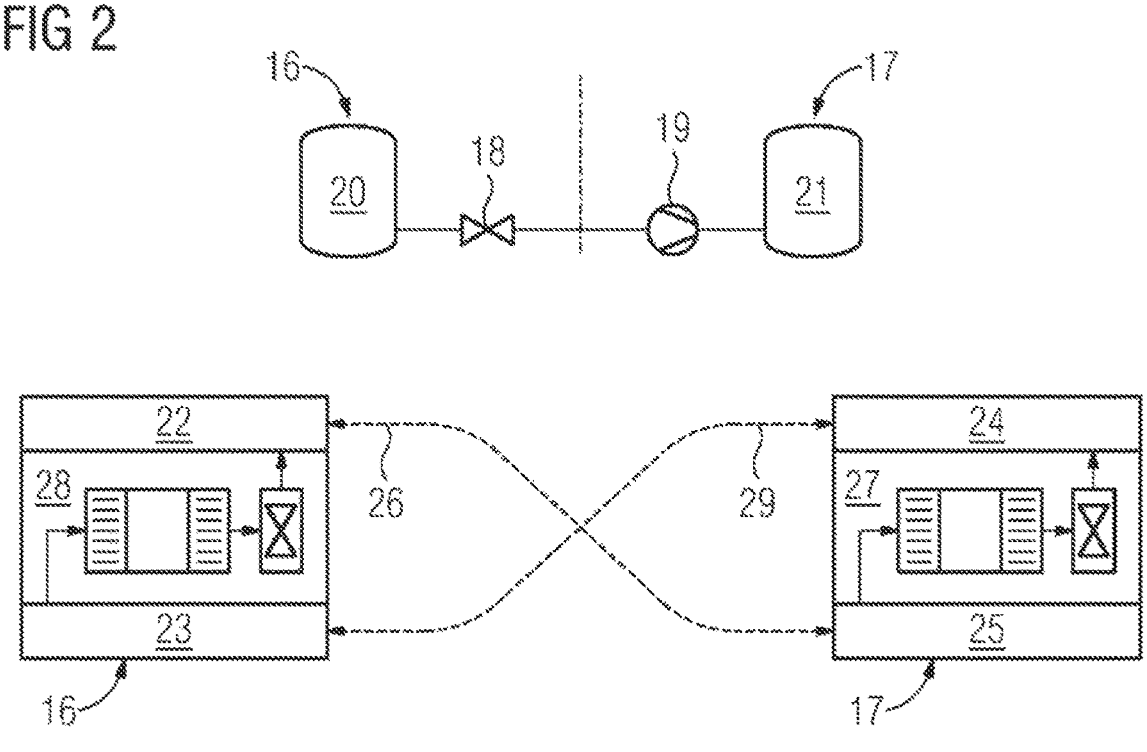
FIG. 2 shows a schematic illustration of two interacting functional modules of a technical installation in accordance with the invention.

FIG. 2 shows a first functional module 16 and a second functional module 17. The first functional module 16 has a valve 18 and a first tank 20, the second functional module 17 has a pump 19 and a second tank 21. If, in the first functional module 16, due to a hardware fault, then the valve closes the flow out of the first tank 20 of the first functional module 16, the pump 19 of the second functional module 17 lying therebehind in the flow direction risks running dry.

The first functional module 16 has, as the communication unit, an OPC UA server 22 and an OPC UA client 23. Similarly, the second functional module 17 has, as the communication unit, an OPC UA server 24 and an OPC UA client 25 (shown in the lower region of FIG. 2). In order to bring about the quickest possible switching-off of the pump 19, the OPC UA client 25 of the second functional module 17 requests a status of the valve 18 of the first functional module 16 via a first OPC UA data line 26 and stores this status in a configurable logic unit 27 of the second functional module 17. In the configurable logic unit 27 of the second functional module 17, the interconnection has previously been stored (as represented, for example, by a higher-level configuration system as shown in FIG. 1), whereupon the status of the valve 18 has a direct influence on a locking of the pump 19.

In a configurable logic unit 28 of the first functional module 16, similarly thereto, it can have been stored that the valve 18 is locked if the pump 19 has been signaled as being defective. The OPC UA client 23 of the first functional module 16 can do this via a second OPC UA data line 29 from the OPC UA server 24 of the second functional module 17. It thus can be possible to effectively prevent unnecessary material flows in the direction toward the pump 19, although the material cannot be further processed due to the defective pump 19.

Figure 3:
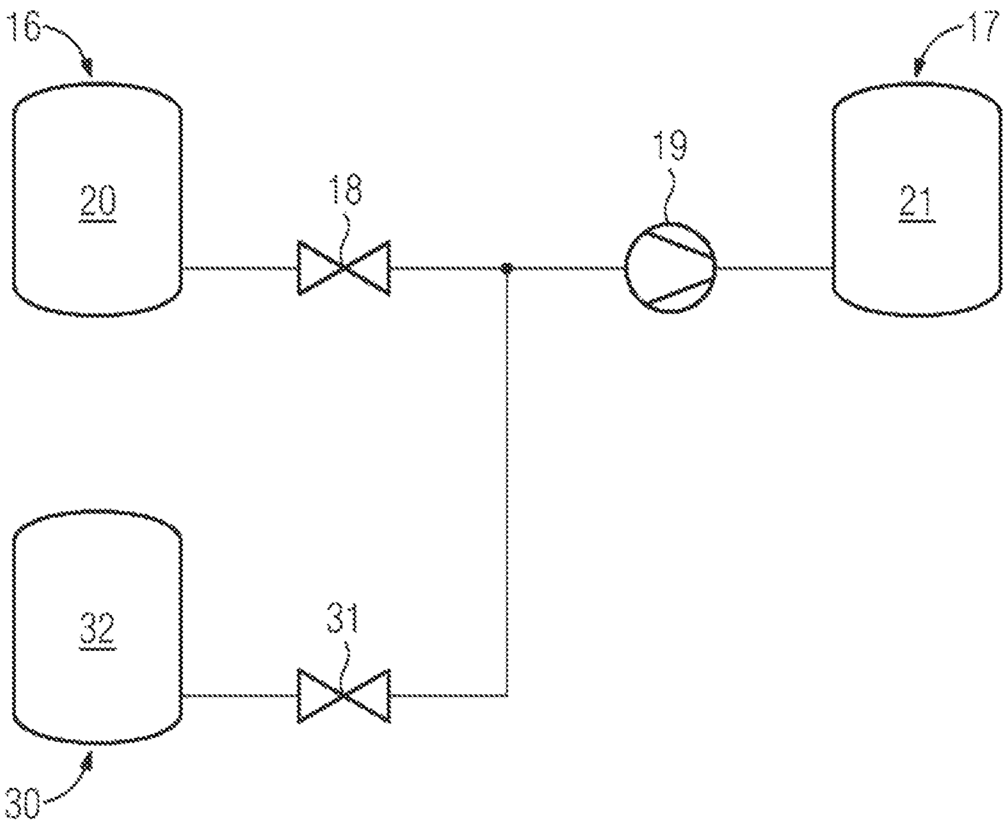
FIG. 3 shows a schematic illustration of three interacting functional modules of a technical installation in a schematic representation.

FIG. 3 shows an extension of the structure from FIG. 2. In addition to the first functional module 16 and the second functional module 17, a third functional module 30 is provided. This is configured similarly to the first functional module 16 and has (at least) one valve 31 and one tank 32. Both the first functional module 16 and also the third functional module 30 are connected (with regard to fluid or material) to the second functional module 17, or more exactly, to its pump 19. Therefore, requests for the status of the valve 18 and the valve 31 are stored in the configurable logic unit 27 of the second functional module 17. Similarly, requests for the status of the pump 19 are stored in the logic units 28 of the first and third functional modules 16, 30.

A functional module 2, 3, 4, 16, 17 which is to perform, for example, a locking of a line dependent upon an external state, requires all the states necessary therefor at the runtime of the functional module 2, 3, 4, 16, 17 or of the technical installation 1. The state information that is to be requested can comprise an information element that possesses a pointer construction to a storage location of the state information to be processed. The pointer construction can be realized, for example, as pointer arithmetic (absolute addressing) or via referencing/dereferencing (symbolic addressing). It is herein important only that no static interconnection is used.

Figure 4:
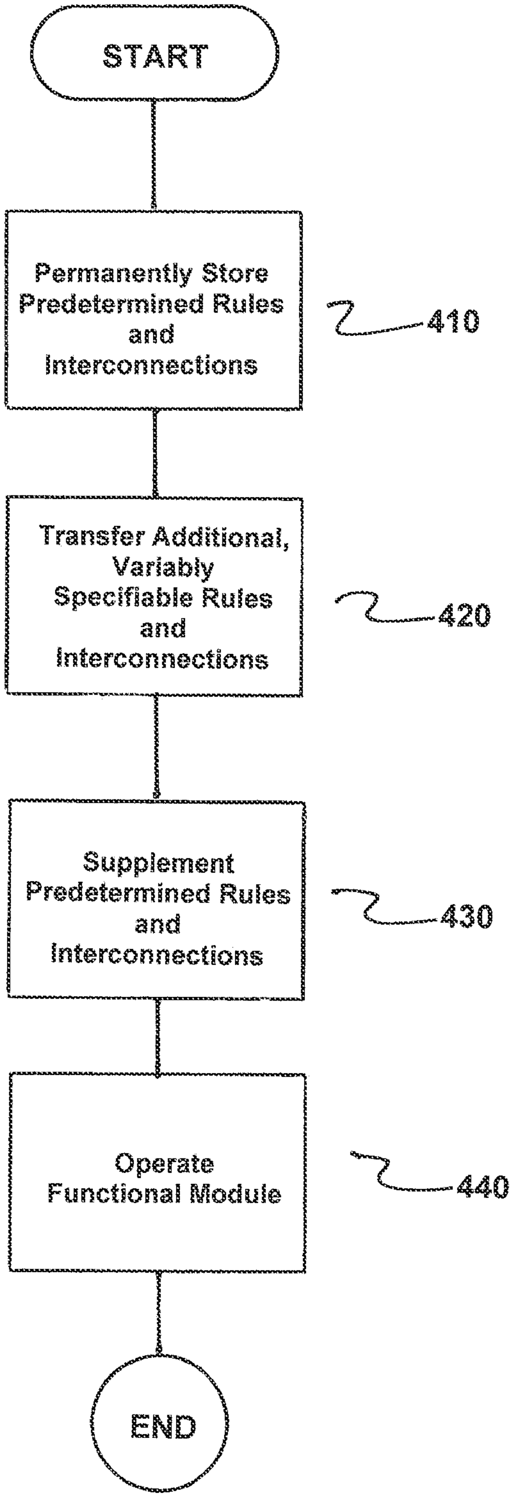
FIG. 4 is a flowchart of the method in accordance with the invention.

FIG. 4 is a flowchart of the method for operating a functional module 2, 3, 4, 16, 17 in a technical installation 1, where the functional module 2, 3, 4, 16, 17 comprises at least one technical object 18, 19, 20, 21, 31, 32 which implements a technical process, a control unit which controls the at least one technical object 18, 19, 20, 21, 31, 32 based on predetermined rules and interconnections, a communication unit 22, 23, 24, 25 which is configured to exchange data with external communication partners, and a configurable logic unit.

The method comprises a) permanently storing the predetermined rules and interconnections in the control unit in an unchangeable manner, as indicated in step 410.

Next, b) additional, variably specifiable rules and interconnections are transferred to the configurable logic unit of the functional module 2, 3, 4, 16, 17 via an external communication partner of the functional module 2, 3, 4, 16, 17, as indicated in step 420.

Next, c) the predetermined rules and interconnections stored in the control unit are supplemented based on previously received additional, variably specifiable rules and interconnections with respect to an interaction of the functional module 2, 3, 4, 16, 17 with at least one further functional module 2, 3, 4, 16, 17 via f the logic unit, as indicated in step 430.

Next, d) the functional module 2, 3, 4, 16, 17 is operated based on adapted rules and interconnections in the technical installation, as indicated in step 440.

Although the invention has been illustrated and described in detail with the preferred exemplary embodiment, the invention is not restricted by the examples given and other variations can be derived therefrom by a person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A functional module, comprising:

at least one technical object which implements a technical process;

a control unit which controls the at least one technical object based on predetermined rules and interconnections which are stored in the control unit in a fixed and unchangeable manner, said predetermined rules and interconnections being specified by a manufacturer of the functional module;

a communication unit which exchanges data with external communication partners;

a configurable logic unit which is configured to receive, via the communication unit additional, variably specifiable rules and interconnections from an external communication partner and, based on the additional, variably specifiable rules and interconnections, to supplement the rules and interconnections predetermined in the control unit with respect to an interaction of the functional module with at least one further functional module.

2. The functional module as claimed in claim 1, wherein the communication unit comprises a server, a client, and a subscriber.

3. The functional module as claimed in claim 2, wherein the server comprises an Open Platform Communications Unified Architecture server, the client comprises an OPC UA client or an OPC UA publisher, and an OPC UA subscriber.

4. A technical installation, comprising a plurality of functional modules as claimed in claim 2 which are connected to one another for an interaction.

5. The technical installation as claimed in claim 4, further comprising:

a configuration system which is configured to communicate the additional, variably specifiable rules and interconnections to the communication unit of one functional module of the plurality of functional modules or to a plurality of communication units of the plurality of functional modules.

6. The technical installation as claimed in claim 5, further comprising:

a visualization system which is configured to visualize the rules and interconnections used to control the at least one technical object of the functional module.

7. The technical installation as claimed in claim 4, further comprising:

a visualization system which is configured to visualize the rules and interconnections used to control the at least one technical object of the functional module.

8. The functional module as claimed in claim 1, wherein the communication unit is configured to receive information relating to a communication unit of the at least one further functional module and is configured to store said received information in the functional module.

9. The functional module as claimed in claim 8, wherein the received information relates to a network address of the communication units of the at least one further functional module.

10. The functional module as claimed in claim 1, wherein the control unit includes computer-implemented function blocks; and wherein the control unit is configured, for controlling the technical objects, to use the computer-implemented functional blocks based on the rules and interconnections permanently stored in the control unit.

11. The functional module as claimed in claim 1, wherein the configurable logic unit includes computer-implemented functional blocks and is configured to undertake, based on the received additional, variably specifiable rules and interconnections, a supplementation of the rules and interconnections predetermined in the control unit with respect to an interaction of the functional module with at least one further functional module based on the computer-implemented functional blocks of the configurable logic unit.

12. A method for operating a functional module in a technical installation, the functional module comprising at least one technical object which implements a technical process, a control unit which controls the at least one technical object based on predetermined rules and interconnections, a communication unit which is configured to exchange data with external communication partners, and a configurable logic unit, the method comprising:

a) permanently storing the predetermined rules and interconnections in the control unit in a fixed and unchangeable manner, said predetermined rules and interconnections being specified by a manufacturer of the functional module;

b) transferring additional, variably specifiable rules and interconnections to the configurable logic unit of the functional module via an external communication partner of the functional module;

c) supplementing the predetermined rules and interconnections stored in the control unit based on previously received additional, variably specifiable rules and interconnections with respect to an interaction of the functional module with at least one further functional module via the logic unit; and d) operating the functional module based on adapted rules and interconnections in the technical installation.

13. The method as claimed in claim 12, wherein said transferring occurs based on a server-client architecture.

14. The method as claimed in one of claim 13, wherein the communication unit receives information relating to communication units of the at least one further functional module and stores said received information in the functional module.

15. The method as claimed in claim 13, wherein the server-client architecture comprises an Open Platform Communications Unified Architecture server-client architecture or an OPC UA publisher-subscriber architecture.

16. The method as claimed in claim 6, wherein the communication unit receives information relating to communication units of the at least one further functional module and stores said received information in the functional module.

17. The method as claimed in claim 16, wherein the received information relates to a network address of the communication units of the at least one further functional module.

18. The method as claimed in claim 12, wherein a communication partner from which the communication unit of the functional module receives the additional, variably specifiable rules and interconnections is a configuration system which is configured to communicate to the communication unit, of the functional module and to a communication unit of at least one further functional module at a runtime of the technical installation additional, variably specifiable rules and interconnections; and wherein, based on previously permanently stored rules and interconnections and based on the additional, variably specifiable rules and interconnections, the functional module and the at least one further functional module interact with one another and possibly with further functional modules at a runtime of the technical installation.

19. The method as claimed in claim 12, wherein the rules and interconnections used to control the at least one technical object the functional module are visualized via a visualization system.

20. A computer program with program code instructions which are executable by a computer for implementing the method as claimed in claim 12.

21. A non-transitory computer-readable medium comprising commands which, when executed by a processor of a computer, cause the computer to perform the method as claimed in claim 12.

* * * * *